(12) United States Patent
Rosenhed

(10) Patent No.: US 7,113,600 B1
(45) Date of Patent: Sep. 26, 2006

(54) BASE TRANSCEIVER STATION AUTOMATIC ENCRYPTION HANDLING

(75) Inventor: Mikael Rosenhed, Staffanstorp (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/439,162

(22) Filed: Nov. 12, 1999

(51) Int. Cl.
*H04K 1/00* (2006.01)
*H04L 9/00* (2006.01)

(52) U.S. Cl. .................. 380/272; 380/247; 380/277

(58) Field of Classification Search .......... 380/277
See application file for complete search history.

(56) References Cited

U.S. PATENT DOCUMENTS

| | | | | |
|---|---|---|---|---|
| 4,549,308 A | * | 10/1985 | LoPinto | 380/272 |
| 5,471,532 A | * | 11/1995 | Gardeck et al. | 380/272 |
| 5,481,610 A | | 1/1996 | Doiron et al. | 380/21 |
| 5,732,349 A | * | 3/1998 | Sanpei et al. | 455/435.1 |
| 5,778,075 A | | 7/1998 | Haartsen | 380/49 |
| 5,781,628 A | * | 7/1998 | Alperovich et al. | 380/258 |
| 5,812,955 A | * | 9/1998 | Dent et al. | 455/561 |
| 5,852,665 A | | 12/1998 | Gressel et al. | 380/30 |
| 5,940,509 A | | 8/1999 | Jovanovich et al. | 380/23 |
| 5,966,657 A | | 10/1999 | Sporre | 455/425 |

FOREIGN PATENT DOCUMENTS

| | | |
|---|---|---|
| WO | 99/09765 | 2/1999 |
| WO | 99/26420 | 5/1999 |

OTHER PUBLICATIONS

*GSM Recommendations*, "Security Aspects," No. 02.09.
*GSM Recommendations*, "Subscriber Identify Modules," No. 02.17.
*GSM Recommendations*, "Security Related Network Functions," No. 03.20.

* cited by examiner

*Primary Examiner*—Gilberto Barron
*Assistant Examiner*—Benjamin E. Lanier

(57) ABSTRACT

A system and method for automatically selecting an encryption, or ciphering, algorithm in a cellular communication network is disclosed. A cellular communication network includes a Base Transceiver Station (BTS) connected to a Base Station Controller (BSC), which is connected to a Mobile services Switching Center (MSC). The BTS is adapted to implement one of at least two different encryption algorithms. The BSC includes a tabular database containing Mobile Country Codes (MCCs) and associated codes corresponding to the allowable encryption algorithm for the MCC. When the BTS is initialized, the BSC's processor retrieves from the tabular database the encryption algorithm code that corresponds to the country in which the BTS resides. This code is transmitted to the BTS, which selects an encryption algorithm based on the value of this code.

17 Claims, 5 Drawing Sheets

| MCC | A5/1 | A5/2 |
|-----|------|------|
| SE  | 1    | 0    |
| GB  | 1    | 0    |
| FR  | 0    | 1    |
| ES  | 0    | 1    |
| XX  | 0    | 0    |

200
- 210 INTERFACE
- 220 PROCESSOR
- 230 ENCRYPTION MODULE (A5/1, A5/2)
- 240 TRANSCEIVER

BASE TRANSCEIVER STATION AUTOMATIC ENCRYPTION HANDLING

BACKGROUND

The present invention relates to a system and method for automatically selecting an encryption algorithm to comply with the requirements of a particular geographic jurisdiction, and more particularly to a system and method for selecting one of a plurality of encryption algorithms to implement on a Base Transceiver Station (BTS) based on the GSM Mobile Country Code parameter in the network's operating system software.

Public cellular communication networks (public land mobile networks) are commonly employed to provide voice and data communication to a plurality of subscribers drawn from the general population. For example, analog cellular radiotelephone systems, such as AMPS, ETACS, NMT-450, and NMT-900, have been deployed successfully throughout the world. Digital cellular radiotelephone systems such as IS-136 and IS-95 in North America, the Personal Digital Cellular (PDC) system in Japan and the pan-European GSM system have been introduced. Some of these systems, and others, are described, for example, in the book titled Cellular Radio Systems by Balston, et al., published by Artech House, Norwood, Mass., 1993.

Security, and particularly securing the communication channel between a remote terminal and a base station, is an issue common to all cellular networks, regardless of the channel access technique. Cellular communication systems employ security mechanisms to avoid cellular telephone fraud and to secure signaling and conversations from interception. The present invention relates to mechanisms for securing the communication channel between a remote terminal and a base station. While the present invention will be explained primarily with reference to GSM networks, principles of the present invention are fully applicable to networks that employ alternate channel access techniques, e.g., CDMA networks.

Referring to FIG. 1, there is illustrated a Public Land Mobile Network (PLMN), such as cellular network 10, in accordance with a GSM architecture. Cellular network 10 includes at least one, and preferably a plurality of areas 12, each with a Mobile Switching Center (MSC) 14 and an integrated Visitor Location Register (VLR) 16 therein. The MSC/VLR area 12, in turn, include a plurality of Location Areas (LA) 18, which are defined as that part of a given MSC/VLR area 12 in which a remote terminal 20 may move freely without having to send update location information to the MSC/VLR area 12 that controls LA 18. Each Location Area 12 is divided into a number of cells 22. Remote terminal 20 is the physical equipment, e.g., a car phone or other portable phone, used by mobile subscribers to communicate with the cellular network 10, each other and users outside the subscribed network, both wireline and wireless.

The MSC 14 is in communication with at least one Base Station Controller (BSC) 23, which, in turn, is in contact with at least one Base Transceiver Station (BTS) 24, which is the physical equipment, illustrated for simplicity as a radio tower, that provides radio coverage to the geographical area of the cell 22. It will be understood that the BSC 23 may be connected to several BTSs 24 and may be implemented as a stand-alone node or as integrated with the MSC 14. The BSC 23 and BTS 24 components are generally referred to as a Base Station System (BSS) 25.

Cellular network 10 includes a Home Location Register (HLR) 26, which is a database maintaining subscriber information, e.g., user profiles, current location information, International Mobile Subscriber Identity (IMSI) numbers, and other administrative information. The HLR 26 may be co-located with a given MSC 14, an integral part of the MSC 14 or service multiple MSCs 14.

The VLR 16 is a database containing information about all of the remote terminals 20 currently located within the MSC/VLR area 12. If a remote terminal 20 roams into a new MSC/VLR area 12, the VLR 16 connected to that MSC 14 will request data about that remote terminal 20 from the HLR database 26, and will inform the HLR 26 of the current location of the remote terminal 20. Accordingly, if a call is placed from the remote terminal 20, the local VLR 16 will have the information necessary to identify and authenticate remote terminal 20 without launching an inquiry to the HLR 26. In this manner, the VLR and HLR databases 16 and 26, respectively, contain various subscriber information associated with a given remote terminal 20.

Various security features of GSM networks are detailed in GSM Recommendations 02.09, "Security Aspects," 02.17, "Subscriber Identity Modules," 03.20, "Security Related Network Functions," and 03.21, "Security Related Algorithms". Security in GSM consists of the following aspects: subscriber identity authentication, subscriber identity confidentiality, signaling data confidentiality, and user data confidentiality. The present invention is primarily concerned with securing user data confidentiality, and particularly concerned with encryption algorithms for encrypting data transmitted across an air interface between a BTS and a remote terminal.

GSM networks encipher, i.e., encrypt, voice and data transmitted on the communication channel between a remote terminal and a BTS. Voice and data communications between a remote terminal and the network are encrypted through use of an encryption algorithm, referred to in GSM as A5. Encrypted communication is initiated by an encryption mode request command from the GSM network. Upon receipt of this command, the mobile station begins encryption and decryption of data using the A5 encryption algorithm and an encryption key (Kc). Presently, GSM offers two different A5 encryption algorithms: A5/1 and A5/2, which is a weaker version of the A5/1 algorithm.

Many countries consider encryption technology a matter of national security, and regulate the importation and exportation of encryption technology. Some governments forbid network operators from encrypting signals transmitted within their jurisdiction. Other governments permit a weak form of encryption (e.g., A5/2), but prohibit a strong form of encryption (e.g., A5/1). Many governments require communication equipment providers and network operators to certify, under penalty of law, that their equipment complies with the requirements.

Accommodating the various governmental restrictions on encryption technology raises technical issues for cellular network equipment providers and network operators. Equipment providers can produce different product configurations to comply with various different encryption restrictions imposed by different governments. However, this is an inefficient use of design, manufacturing, distribution, and training resources.

Accordingly, there is a need for network systems and methods that comply with the encryption restrictions of various different governments. To promote efficient use of resources, there is a need for network systems capable of implementing one of two or more different encryption algorithms, and automatically selecting one of the encryption algorithms, to comply with a governmental restriction.

SUMMARY

The present invention addresses these and other needs by providing a network architecture and method of operation that enables the network to determine automatically which encryption algorithm is authorized in a particular geographic region, and to implement the authorized encryption algorithm when the BTS is intialized. In an exemplary embodiment, a cellular GSM network embodying the invention includes a BTS connected to a BSC, which is connected to a MSC. The BTS is adapted to implement one of at least two different encryption algorithms. The BSC is adapted to include an encryption algorithm database containing Mobile Country Codes (MCC) and associated codes corresponding to the allowable encryption algorithm for the country represented by the MCC. When a BTS is initialized (or restarted), a processor associated with the BSC extracts the MCC for the country in which the BSC resides from the GSM System Information 3 or GSM System Information 4 data residing in memory on the BSC. The BSC then searches the encryption algorithm database for a record having an MCC that matches the MCC obtained from the GSM System Information. If a match is found, then the BSC obtains a code representing the encryption algorithm from the database. This code is transmitted to the BTS, which selects an encryption algorithm based on the value of this code.

In alternate embodiments, the encryption algorithm database may be stored in a memory associated with other network elements, for example the MSC or the BTS. A processor associated with the network element that maintains the encryption algorithm database obtains the MCC from the GSM System Information and retrieves an encryption algorithm code from the database. The code is then transmitted to the BTS, which selects an encryption algorithm based on the value of the code.

In one aspect, the invention provides a method, in a cellular communication system, for automatic selection of an encryption algorithm for use in a base transceiver station. The method comprises the steps of extracting, from network information, a region code representative of the geographic jurisdiction in which the base transceiver station resides, searching an encryption algorithm database for a code matching the region code, and, if a match is found, then applying an encryption algorithm associated with the region code in the encryption database.

In another aspect, the invention provides a method, in a cellular communication network that operates in accordance with GSM standards, for automatic selection of an encryption algorithm for use in one or more base transceiver stations located in a cell. At a base station controller, the method comprises the step of receiving a signal indicating that the base transceiver station is being initialized, and, in response to the signal, retrieving a mobile country code from system information stored in a memory associated with the base station controller, retrieving, from a database stored in a memory associated with the base station controller, an encryption algorithm selection code associated with the mobile country code, and transmitting the encryption algorithm selection code to at least one base transceiver station in the cell. At the base transceiver station, the method includes the step of selecting an encryption algorithm corresponding to the encryption algorithm selection code for use with communication from the base transceiver station.

In another aspect, the invention provides a method, in a cellular communication network that operates in accordance with GSM standards, for automatic selection of an encryption algorithm for use in one or more base transceiver stations located in a cell. At a mobile services switching center, the method comprises the steps of receiving a signal indicating that the base transceiver station is being initialized, and in response to the signal, retrieving a mobile country code from system information stored in a memory associated with the mobile services switching center, retrieving, from a database stored in a memory associated with the mobile services switching center, an encryption algorithm selection code associated with the mobile country code, and transmitting the encryption algorithm selection code to at least one base transceiver station in the cell. At the base transceiver station, the method comprises selecting an encryption algorithm corresponding to the encryption algorithm selection code for use with communication from the base transceiver station.

According to a further aspect, the invention comprises a network node for use in a cellular communication network. The base station comprises a communication module, a processor, a memory module, operatively associated with the processor, operating software, residing in the memory module, comprising a code that indicates the country in which the base station controller resides, and an encryption algorithm database stored in the memory module, the encryption algorithm database including country codes and associated codes indicating authorized encryption algorithms.

According to a further aspect, the invention comprises a cellular communication network. The network comprises a network node which comprises a memory module for storing operating software, the operating software including a code indicating the country in which the base station controller resides, and an encryption algorithm database including country codes and associated codes indicating authorized encryption algorithms, and a processor for retrieving the country code from the operating system software, searching the encryption algorithm database for an encryption algorithm code associated with the country code, and transmitting a signal representative of the encryption algorithm code to the base transceiver station. The network further comprises a base transceiver station including an encryption module adapted to select one of at least two different encryption algorithms in response to the signal received from the base station controller.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
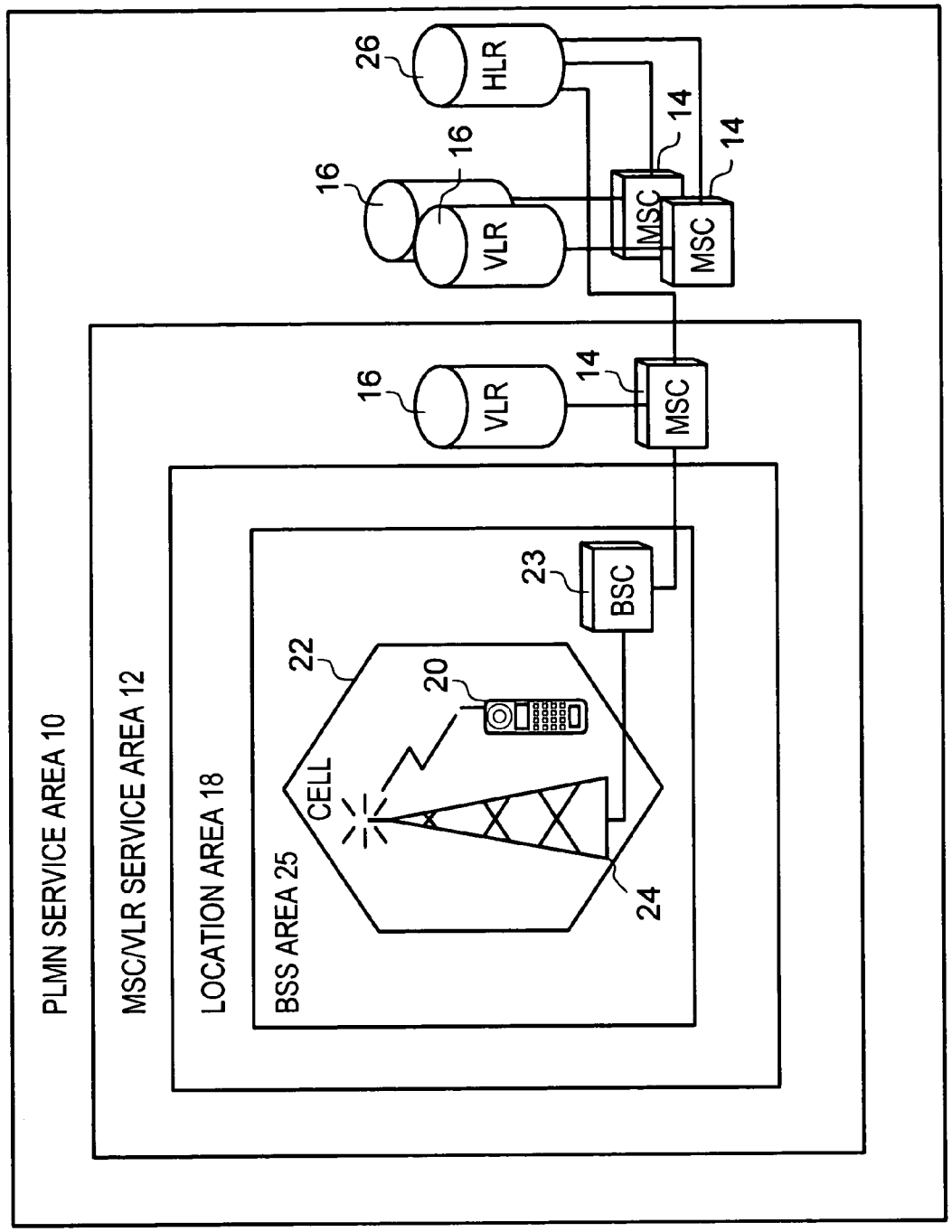
FIG. 1 is a block diagram of a conventional cellular communication system such as may be employed in practicing the system and method of the present invention.
Figures 2, 4:
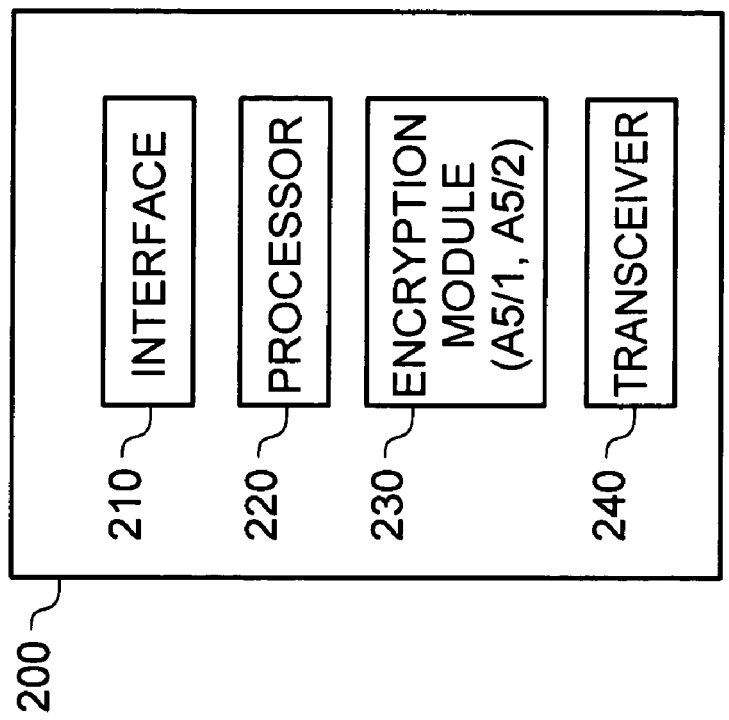
FIG. 2 is a block diagram of a base transceiver station in accordance with aspects of the present invention.
FIG. 4 is a schematic depiction of a tabular database comprising codes representative of geographic regions and codes indicating authorized encryption schemes in the geographic region.

The present invention provides a modified network architecture and method of operation to enable a network, such as the network depicted in FIG. 1, to select automatically an encryption algorithm authorized for use in the geographic region in which the network resides, or to avoid encryption where it is prohibited. In one aspect, in accordance with the present invention a conventional BTS may be modified to enable at least two different encryption algorithms. Referring to FIG. 2, a schematic illustration of an exemplary BTS 200 depicts portions of BTS 200 relevant to the present invention. In relevant part, BTS 200 includes an interface 210 for communicating with a BSC or other network element, a processor 220, an encryption module 230, and a transceiver 240.

Encryption module 230 is adapted to support at least two different encryption algorithms (e.g., A5/1 and A5/2) and to include a processor 220 having logic instructions adapted to select one of the encryption algorithms (or no encryption), based on a signal received from a BSC. The functions of processor 220 and the encryption module 230 may be implemented on an Application Specific Integrated Circuit (ASIC) or may be implemented in logic instructions (e.g., software) operating on a general purpose processor. Transceiver 240 may be of conventional design.

Figure 3:
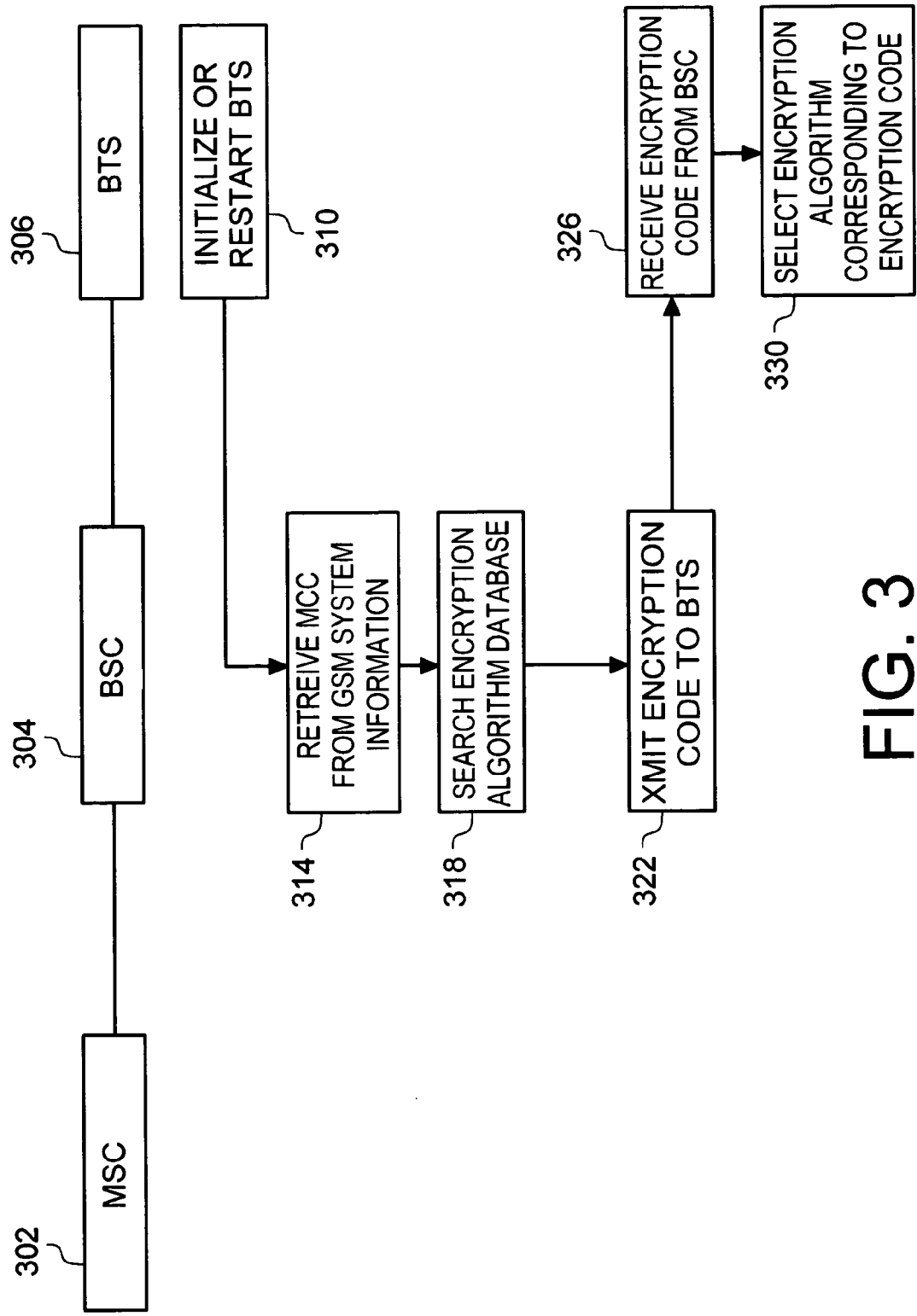
FIG. 3 is a flow chart illustrating a method of operating a network in accordance with aspects of the present invention.

Referring to FIG. 3, a method of operating a cellular network in accordance with the invention is described. Referring to FIG. 3, a cellular network includes at least one MSC 302 connected to at least one BSC 304, which is in turn connected to at least one BTS 306. At step 310, BTS 306 transmits a signal to BSC 304 indicating that BTS 306 is being initialized or restarted. In response to the signal from BTS 306, a processor associated with BSC 304 retrieves the MCC for the country in which the BSC 304 resides from the GSM System Information 3 or GSM System Information 4 resident in a memory associated with BSC 304 (step 314). A processor associated with BSC 304 then searches an encryption algorithm database stored in a memory associated with BSC 304 for a record having an MCC that matches the MCC retrieved from the GSM System Information (step 318). If a matching record is found, then BSC 304 transmits a code that indicates which of the encryption algorithms implemented on BTS 306 is authorized in the country corresponding to the MCC (step 322).

At step 326, BTS 306 receives the code from the BSC 304, and at step 330, BTS 306 selects an encryption algorithm that corresponds to the code, which may be no encryption. The BTS may then implement the selected encryption algorithm in a conventional manner. If, at step 318, no matching record is found, then BSC 304 may transmit to BTS 306 a code indicating that the encryption algorithm database did not include a record for the MCC extracted from the GSM System Information in the BSC. If BTS 306 receives this message, it will select a default encryption setting, which may be no encryption. It will be appreciated that a GSM cell may include a plurality of BTSs, and that the BSC may transmits the encryption algorithm code to more than one BTS.

FIG. 4 is an abstract representation of an encryption algorithm database 400 in accordance with the present invention. Database 400 may generally be represented as a tabular database having M columns and N rows. In the illustrated embodiment, database 400 includes a first column 410 for storing MCCs, a second column 412 for storing a binary code that indicates whether the MCC allows A5/1 encryption, and a third column for storing a binary code that indicates whether the MCC allows A5/2 encryption. Assuming a '1' represents an affirmative indicator and a '0' represents a negative indicator, database 400 indicates that Sweden and Great Britain permit A5/1 encryption, while France and Spain permit A5/2 encryption. It will be appreciated that certain countries may prohibit all forms of encryption, as indicated by country "xx".

The particular format of database 400 is not critical to the invention, provided that database relates an encryption algorithm code to an MCC in an effective manner. One of ordinary skill in the data processing arts will appreciate that database 400 may be of numerous alternate embodiments. For example, database 400 may be limited to a 2×N database by assigning a specific code the encryption algorithm permitted in the country represented by the MCC, and associating the specific code with the MCC in database 400.

Preferably, database 400 is stored in a permanent memory (e.g., hard-coded) associated with BSC 304 and write-protected to prevent the network operator from altering its contents. Various data processing security measures (e.g., cyclical redundancy checks, data encryption) may be implemented to ensure that database 400 is not manipulated by the network operator.

Referring to FIG. 2 through FIG. 4, assume by way of example that a BTS in Great Britain is being initialized (or restarted). The BTS signals the BSC that it is intializing, and the BSC retrieves the MCC from its GSM System Information 3 (or 4) to retrieve the encryption algorithm code from the encryption algorithm database, which indicates that Great Britain authorizes A5/1 encryption. The BSC transmits the encryption algorithm code to the BTS. The processor in the BTS receives the code and selects the A5/1 encryption algorithm in the encryption module. BTS then uses the A5/1 algorithm for all encrypted communications. By contrast, a BTS initialized in France would select the A5/2 algorithm and a BTS initialized in the hypothetical country represented by "xx" would not implement an encryption algorithm.

Thus, the present invention provides a modified network architecture and method of operation that enables the network to select automatically the encryption algorithm that is authorized for use in a designated geographic region. In a GSM network, the network can use the MCC parameter to select the encryption algorithm. Linking the encryption algorithm to the MCC is advantageous for several reasons. The MCC is a defined variable in GSM operating system software, so implementing the invention does not require modifications to a GSM operating system. Also, network operators have compelling reasons not to manipulate the GSM MCC in an attempt to use an unauthorized encryption scheme. First, GSM network operators are contractually bound not to modify certain GSM operating system parameters, one being the MCC. Second, modification of the MCC parameter would cause network malfunction when the network operator's subscribers roam because the MCC is used in Location Area Identity (LAI) information which is used in the location updating procedure. Third, modifying the MCC may cause errors throughout the network. MCCs, which are assigned by the Consultative Committee on International and Telegraphy (CCITT), are encoded to be unique parameters. Changing or duplicating an MCC can cause system errors. Fourth, modification of the MCC parameter would be detectable, at least by the network malfunction that would result.

Figure 5:
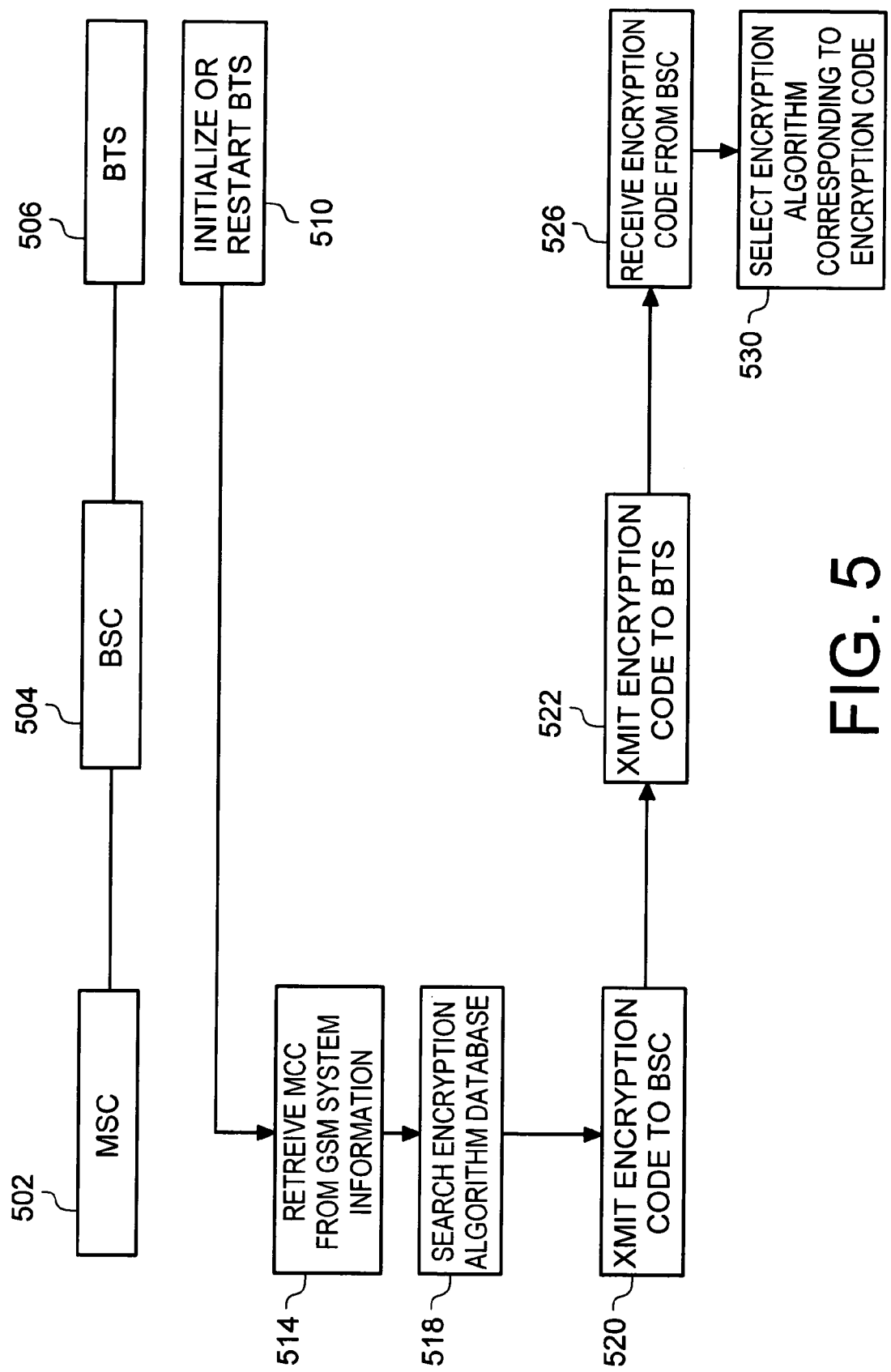
FIG. 5 is a flow chart illustrating a method of operating a network in accordance with an alternate embodiment of the present invention.

In the embodiment described in connection with FIG. 3, the encryption algorithm database 400 is stored in a memory associated with a BSC. It will be appreciated that the encryption algorithm database 400 could be stored in a different network device, with appropriate messaging between the network devices. By way of example, FIG. 5 is a schematic depiction of a method of operating a network in accordance with the invention in which the encryption algorithm database 400 resides in a memory associated with an MSC. Referring to FIG. 5, a cellular network includes at least one MSC 502 connected to at least one BSC 504, which is in turn connected to at least one BTS 506. At step 510, BTS 506 transmits a signal to MSC 502 indicating that BTS 506 is being initialized or restarted. In response to the signal from BTS 506, a processor associated with MSC 502 retrieves the MCC for the country in which the MSC 502 resides from the GSM System Information 3 or GSM System Information 4 resident in a memory associated with MSC 502 (step 614). A processor associated with MSC 502 then searches an encryption algorithm database stored in a memory associated with MSC 502 for a record having an MCC that matches the MCC retrieved from the GSM System Information (step 518). If a matching record is found, then MSC 502 transmits to BTS 506 (usually via BSC 504) a code that indicates which of the encryption algorithms implemented on BTS 506 is authorized in the country corresponding to the MCC (step 522).

At step 526, BTS 506 receives the code from the BSC 504 and, at step 530, BTS 506 selects an encryption algorithm that corresponds to the code, which may be no encryption. BTS 506 may then implement the selected encryption algorithm in a conventional manner. If, at step 518, no matching record is found, then MSC 502 may transmit to BTS 506 a code indicating that the encryption algorithm database did not include a record for the MCC extracted from the GSM System Information. If BTS 506 receives this message, it will select a default encryption setting, which may be no encryption. It will be appreciated that a GSM cell may include a plurality of BTSs, and that the MSC may transmits the encryption algorithm code to more than one BTS.

Figure 6:
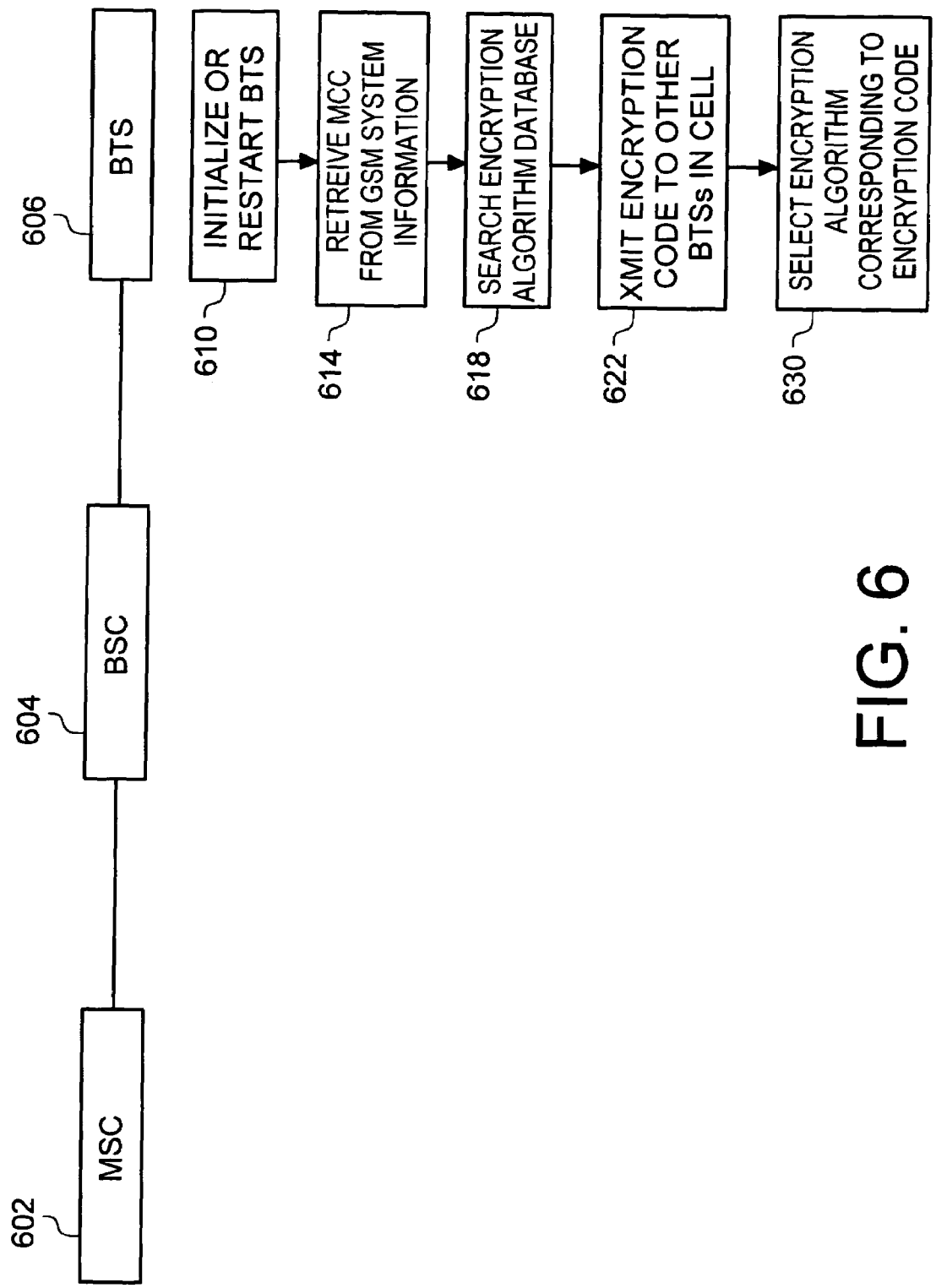
FIG. 6 is a flow chart illustrating a method of operating a network in accordance with an alternate embodiment of the present invention.

FIG. 6 is a schematic depiction of a method of operating a network in accordance with the invention in which the encryption algorithm database 400 resides in a memory associated with a BTS. Locating the encryption algorithm database 400 in a memory associated with a BTS reduces the number of messaging communications required between the BTS and the BSC (or MSC), but may require additional messaging between BTSs in cells with multiple BTSs. Referring to FIG. 6, when a BTS 606 is initialized or restarted (step 610) a processor associated with BTS 606 retrieves the MCC for the country in which the BTS 606 resides from the GSM System Information 3 or GSM System Information 4 resident in a memory associated with BTS 606 (step 514). A processor associated with BTS 606 then searches an encryption algorithm database (e.g., database 400) stored in a memory associated with BTS 606 for a record having an MCC that matches the MCC retrieved from the GSM System Information (step 618). If all BTSs in the cell are being initialized (or restarted) then BTS 606 may be required to transmit the encryption code to other BTSs in the cell. Thus, if a matching record is found, then BTS 606 transmits to other BTSs (usually via BSC 604 or by a broadcast over a radio link, or by a dedicated wireline link, a code that indicates which of the encryption algorithms implemented on BTS 606 is authorized in the country corresponding to the MCC (step 622). In existing GSM communication networks, GSM System Information 3 and GSM System Information 4 are distributed only to a single BTS in a cell, i.e., the BTS that controls the Broadcast Control Channel (BCCH) for the cell. It will be appreciated that future GSM networks may transmit GSM System Information to multiple BTSs in a cell.

At step 630, BTS 606 selects an encryption algorithm that corresponds to the code. BTS 606 may then implement the selected encryption algorithm in a conventional manner. If, at step 618, no matching record is found, then BTS 606 may transmit to other BTSs in the cell a code indicating that the encryption algorithm database did not include a record for the MCC extracted from the GSM System Information. If a BTS 606 receives this message, it will select a default encryption algorithm, which may be no encryption.

The present invention provides a network architecture and method by which a network equipment provider can use a single hardware and software variant that automatically selects one of multiple encryption algorithms to comply with relevant governmental restrictions on encryption technology. This facilitates the efficient use of manufacturing, inventory, distribution, and training resources.

The present invention is described above with reference to particular embodiments, and it will be readily apparent to those skilled in the art that it is possible to embody the invention in forms other than those described above. The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of automatically selecting an encryption algorithm for use in a base transceiver station in a cellular communication system, said method comprising the steps of:
    storing a plurality of different encryption algorithms in an encryption algorithm database;
    extracting, from network information, a region code representative of the geographic jurisdiction in which the base transceiver station resides;
    searching the encryption algorithm database for an encryption algorithm matching the region code; and
    if a match is found, then selecting the encryption algorithm from the encryption algorithm database that matches the region code.

2. The method according to claim 1, wherein the step of extracting, from network information, a region code representative of the geographic jurisdiction in which the base transceiver station resides comprises:
    retrieving the region code from system information stored in a memory module.

3. The method according to claim 1, wherein:
    the network information is stored in a memory associated with a first network element and the encryption algorithm database is stored in a second network element.

4. The method according to claim 1, further comprising the step of:
    encrypting information using the selected encryption algorithm.

5. A method of automatically selecting an encryption algorithm for use in one or more base transceiver stations located in a cell in a cellular communication network, said method comprising the steps of:

storing a plurality of encryption algorithm selection codes in a database associated with a base station controller;

receiving, at the base station controller, a signal indicating that a base transceiver station is being initialized;

in response to the signal, retrieving a mobile country code from system information stored in a memory associated with the base station controller;

retrieving, from the database associated with the base station controller, an encryption algorithm selection code associated with the mobile country code;

transmitting the retrieved encryption algorithm selection code to the base transceiver station being initialized; and selecting from a plurality of different encryption algorithms at the base transceiver station, an encryption algorithm corresponding to the retrieved encryption algorithm selection code for use when communicating between the base transceiver station and a remote terminal.

6. The method according to claim 5, further comprising the step of:

encrypting information using the selected encryption algorithm.

7. A method of automatically selecting an encryption algorithm for use in one or more base transceiver stations located in a cell in a cellular communication network that operates in accordance with GSM standards, said method comprising the steps of:

storing a plurality of encryption algorithm selection codes in a database associated with a mobile services switching center;

receiving, at the mobile services switching center, a signal indicating that a base transceiver station is being initialized;

in response to the signal, retrieving a mobile country code from system information stored in a memory associated with the mobile services switching center;

retrieving, from the database associated with the mobile services switching center, an encryption algorithm selection code associated with the mobile country code;

transmitting the retrieved encryption algorithm selection code to the base transceiver station being initialized; and selecting from a plurality of different encryption algorithms at the base transceiver station, an encryption algorithm corresponding to the retrieved encryption algorithm selection code for use when communicating between the base transceiver station and a remote terminal.

8. The method according to claim 7, wherein the step of transmitting the retrieved encryption algorithm selection code to the base transceiver station comprises:

transmitting the retrieved encryption algorithm selection code from the mobile services switching center to a base station controller; and transmitting the retrieved encryption algorithm selection code from the base station controller to the base transceiver station.

9. The method according to claim 7, further comprising the step of:

encrypting information using the selected encryption algorithm.

10. A network node for use in a cellular communication network having a plurality of base transceiver stations, at least one base station controller, and at least one mobile services switching center, comprising:

a processor;

a memory module, operatively associated with the processor;

operating software residing in the memory module, said software including a country code that indicates the country in which a selected base transceiver station resides; and an encryption algorithm database stored in the memory module, the encryption algorithm database including codes representative of a plurality of countries and a plurality of encryption algorithm codes indicating different encryption algorithms authorized in each of the plurality of countries;

wherein the processor retrieves the country code from the system software, searches the encryption algorithm database for an encryption algorithm code associated with the country code, and transmits a signal representative of the encryption algorithm code to the selected base transceiver station.

11. The network node according to claim 10, wherein: the network node comprises a base transceiver station.

12. The network node according to claim 10, wherein: the network node comprises a base station controller.

13. The network node according to claim 10, wherein: the network node comprises a mobile services switching center.

14. A cellular communication network, comprising:

a network node comprising:

a memory module for storing operating software, the operating software including a country code indicating the country in which a base station controller resides, and an encryption algorithm database including a plurality of country codes and a plurality of associated codes indicating different authorized encryption algorithms; and a processor for retrieving the country code from the operating system software, searching the encryption algorithm database for an encryption algorithm code associated with the country code, and transmitting a signal representative of the encryption algorithm code to the base transceiver station; and a base transceiver station including an encryption module adapted to select one of at least two different encryption algorithms in response to the signal received from the base station controller.

15. The cellular communication network according to claim 14, wherein:

the network node comprises a base transceiver station.

16. The cellular communication network according to claim 14, wherein;

the network node comprises a base station controller.

17. The cellular communication network according to claim 14, wherein:

the network node comprises a mobile services switching center.

* * * * *

UNITED STATES PATENT AND TRADEMARK OFFICE
CERTIFICATE OF CORRECTION

| | |
|---|---|
| PATENT NO. | : 7,113,600 B1 |
| APPLICATION NO. | : 09/439162 |
| DATED | : September 26, 2006 |
| INVENTOR(S) | : Rosenhed |

It is certified that error appears in the above-identified patent and that said Letters Patent is hereby corrected as shown below:

In Column 10, Line 22, in Claim 10, after "from the" insert -- operating --.

Signed and Sealed this

Twenty-fifth Day of December, 2007

JON W. DUDAS
*Director of the United States Patent and Trademark Office*